US009969322B1

(12) United States Patent
Yu et al.

(10) Patent No.: US 9,969,322 B1
(45) Date of Patent: May 15, 2018

(54) VEHICLE, WINCH FOR VEHICLE AND DISPLAY CONTROL DEVICE FOR WINCH

(71) Applicant: T-MAX (HANGZHOU) TECHNOLOGY CO., LTD., Hangzhou (CN)

(72) Inventors: Hangfei Yu, Hangzhou (CN); Xing Fan, Hangzhou (CN)

(73) Assignee: T-MAX (HANGZHOU) TECHNOLOGY CO., LTD., Hangzhou (CN)

( * ) Notice: Subject to any disclaimer, the term of this patent is extended or adjusted under 35 U.S.C. 154(b) by 0 days. days.

(21) Appl. No.: 15/373,779

(22) Filed: Dec. 9, 2016

(30) Foreign Application Priority Data

Oct. 31, 2016 (CN) ..................... 2016 2 1156266 U
Oct. 31, 2016 (CN) ..................... 2016 2 1193765 U
Oct. 31, 2016 (CN) ..................... 2016 2 1194211 U

(51) Int. Cl.

| | |
|---|---|
| ***H05B 37/02*** | (2006.01) |
| ***B60Q 1/24*** | (2006.01) |
| ***F21S 4/28*** | (2016.01) |
| ***H05B 33/08*** | (2006.01) |
| ***B66D 1/12*** | (2006.01) |
| *F21Y 115/10* | (2016.01) |
| *F21Y 113/13* | (2016.01) |

(52) U.S. Cl.
CPC ................. *B60Q 1/24* (2013.01); *B66D 1/12* (2013.01); *F21S 4/28* (2016.01); *H05B 33/0872* (2013.01); *H05B 37/0227* (2013.01); *B66D 2700/0141* (2013.01); *F21Y 2113/13* (2016.08); *F21Y 2115/10* (2016.08)

(58) Field of Classification Search
CPC ... B66D 3/00; B66D 1/40; B66D 1/54; B66D 1/485; B66D 2700/041; B66D 1/12; B60Q 1/24; H05B 33/0872; H05B 37/0227; F21S 4/28; F21Y 2113/13; F21Y 2115/10
USPC ........................................................ 315/77
See application file for complete search history.

(56) References Cited

U.S. PATENT DOCUMENTS

2005/0072965 A1* 4/2005 Sanders ................ B66D 1/485
254/361
2005/0253125 A1* 11/2005 Drarvik .................... B66D 1/12
254/347
2009/0284204 A1* 11/2009 Colby ..................... H02P 23/14
318/490

(Continued)

*Primary Examiner* — Don Le
(74) *Attorney, Agent, or Firm* — Howard & Howard Attorneys PLLC

(57) ABSTRACT

The present disclosure provides a vehicle, a winch for a vehicle, and a display control device for a winch of a vehicle. The winch includes a motor for driving an operation of the winch, and the display control device includes a display component and a display control panel. The display control panel is provided with a load detector, a processor and a light controller. The load detector detects a load situation of the motor. The processor is connected with the load detector and the light controller respectively, and outputs a light control signal to the light controller according to the load situation of the motor, and the light controller is connected with the display component and controls the display component to display corresponding light according to the light control signal received from the processor. Thus, the actual load situation of the winch can be obtained in real time during use.

17 Claims, 6 Drawing Sheets

(56) References Cited

U.S. PATENT DOCUMENTS

| | | | | |
|---|---|---|---|---|
| 2010/0114381 | A1* | 5/2010 | Welch | B63B 35/816 700/275 |
| 2015/0266707 | A1* | 9/2015 | Holmberg | B66D 1/12 254/362 |
| 2015/0284223 | A1* | 10/2015 | Hall | B66D 1/38 254/333 |
| 2015/0307332 | A1* | 10/2015 | Huang | B66D 1/28 254/323 |
| 2016/0046468 | A1* | 2/2016 | Heravi | B66D 1/40 715/835 |
| 2016/0257534 | A1* | 9/2016 | Kawai | B66C 13/50 |
| 2016/0258537 | A1* | 9/2016 | Heiderman | F16K 1/303 |
| 2016/0318740 | A1* | 11/2016 | Kos | B66D 1/54 |
| 2017/0036337 | A1* | 2/2017 | Sawano | B23B 45/008 |

* cited by examiner

VEHICLE, WINCH FOR VEHICLE AND DISPLAY CONTROL DEVICE FOR WINCH

CROSS-REFERENCE TO RELATED APPLICATION

The present application is based upon and claims priority to Chinese Patent Application Nos. 201621193765.2, 201621156266.6, and 201621194211.4, all of which were filed on Oct. 31, 2016 and the entire contents of which are incorporated herein by reference.

TECHNICAL FIELD

The present disclosure relates to a traction equipment field, and more particularly, to a display control device for a winch of a vehicle, a winch for a vehicle and a vehicle.

BACKGROUND

A winch is mainly used for a special vehicle such as an off-road vehicle, an agricultural vehicle, a yacht, a fire truck and a road obstacle vehicle. The winch is a self-protection and traction equipment for the vehicle and the vessel, can perform a rescue in severe environments such as snowfield, swamp, desert, beach, and muddy road, and can work in other conditions, for example, remove obstacles, drag objects and install facilities. In the related art, the winch is generally controlled manually, which is not convenient to perform in actual practice, is impossible to obtain a working situation of the winch, and is hard to satisfy needs.

SUMMARY

In order to overcome the problem in the related art, the present disclosure provides a display control device for a winch of a vehicle, a winch of a vehicle and a vehicle.

According to a first aspect of embodiments of the present disclosure, a display control device for a winch of a vehicle is provided. The winch includes a motor for driving an operation of the winch, and the display control device includes a display component and a display control panel. The display control panel includes a load detector, a processor and a light controller. The load detector is configured to detect a load situation of the motor. The processor is connected with the load detector, and configured to output a light control signal according to the load situation of the motor. The light controller is connected with the processor and the display component respectively, and configured to receive the light control signal and to control the display component according to the light control signal.

With the display control device according to embodiments of the present disclosure, the load situation of the motor is detected by the load detector, the corresponding light control signal is output to the light controller by the processor according to the real-time load situation of the motor, and the display component is controlled by the light controller to display different lights. Thus, the display control device according to embodiments of the present disclosure can realize different light display based on different load situations of the winch, and can obtain the real-time load situation of the winch in time during actual use, thus avoiding some extreme cases such as super-load operation, ensuring safe, reliable and stable operation of the winch, prolong service life of the winch, and sufficiently satisfying usage requirements.

In an embodiment, the display component includes a first light bar disposed on a winch body of the winch and configured to display different lights under a control of the light controller.

In another embodiment, the display component includes a first light bar and a second light bar, the first light bar is disposed on a winch body of the winch and configured to display different lights under a control of the light controller, and the second light bar is disposed on an operating handle of the winch and configured to display different lights under a control of the light controller.

In an embodiment, the first light bar and the second light bar are configured to display a light simultaneously under the control of the light controller.

In an embodiment, each of the first light bar and the second light bar includes a plurality of LED lamps, and the light controller is configured to control a number and a color of lighted lamps of the plurality of LED lamps according to the light control signal.

In an embodiment, the first light bar is built in the winch body of the winch.

In another embodiment, the first light bar is exposed on the winch body of the winch.

In an embodiment, the load detector includes a current signal collection circuit configured to collect a working current of the motor for detecting the load situation of the motor.

In an embodiment, the current signal collection circuit is connected with the motor via a current sampling wire, and the current signal collection circuit includes: a first sampling end, connected with a first end of the current sampling wire; a second sampling end, connected with a second end of the current sampling wire; a first filter and voltage divider, connected with the first sampling end; a second filter and voltage divider, connected with the second sampling end; and a differential operational amplifier, having a first input end connected with the first filter and voltage divider, a second input end connected with the second filter and voltage divider, and an output end connected with the processor.

In an embodiment, the display control panel further includes a power supply component having a voltage conversion circuit, in which the voltage conversion circuit is configured to convert a battery voltage of the vehicle for supplying power to the display control panel.

According to a second aspect of embodiments of the present disclosure, a winch for a vehicle is provided. The winch includes the display control device according to the first aspect of embodiments of the present disclosure.

According to the winch provided by embodiments of the present disclosure, with the above display control device, different light display can be realized based on different load situations, and the real-time load situation of the winch can be obtained in time during actual use, thus avoiding some extreme cases such as super-load operation, ensuring safe, reliable and stable operation of the winch, prolong service life of the winch, and sufficiently satisfying usage requirements.

According to a third aspect of embodiments of the present disclosure, a vehicle is provided. The vehicle includes the winch according to the second aspect of the present disclosure.

According to the vehicle provided by embodiments of the present disclosure, different light display can be realized based on different load situations, and the real-time load situation of the winch can be obtained in time during actual use, thus avoiding some extreme cases such as super-load operation, ensuring safe, reliable and stable operation of the winch, prolong service life of the winch, and sufficiently satisfying usage requirements.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In the following, a display control device for a winch of a vehicle, a winch for a vehicle and a vehicle according to embodiments of the present disclosure are described in detail with reference to drawings.

Referring to FIGS. 1-8, in embodiments of the present disclosure, the winch 100 for a vehicle may be a DC (Direct Current) electric winch including a motor M for driving an operation of the winch. The motor M may be a permanent magnet motor, or a series motor.

Figure 2:
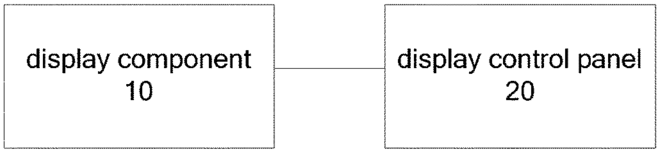
FIG. 2 is a block diagram of a display control device for a winch of a vehicle according to an embodiment of the present disclosure.
Figure 3:
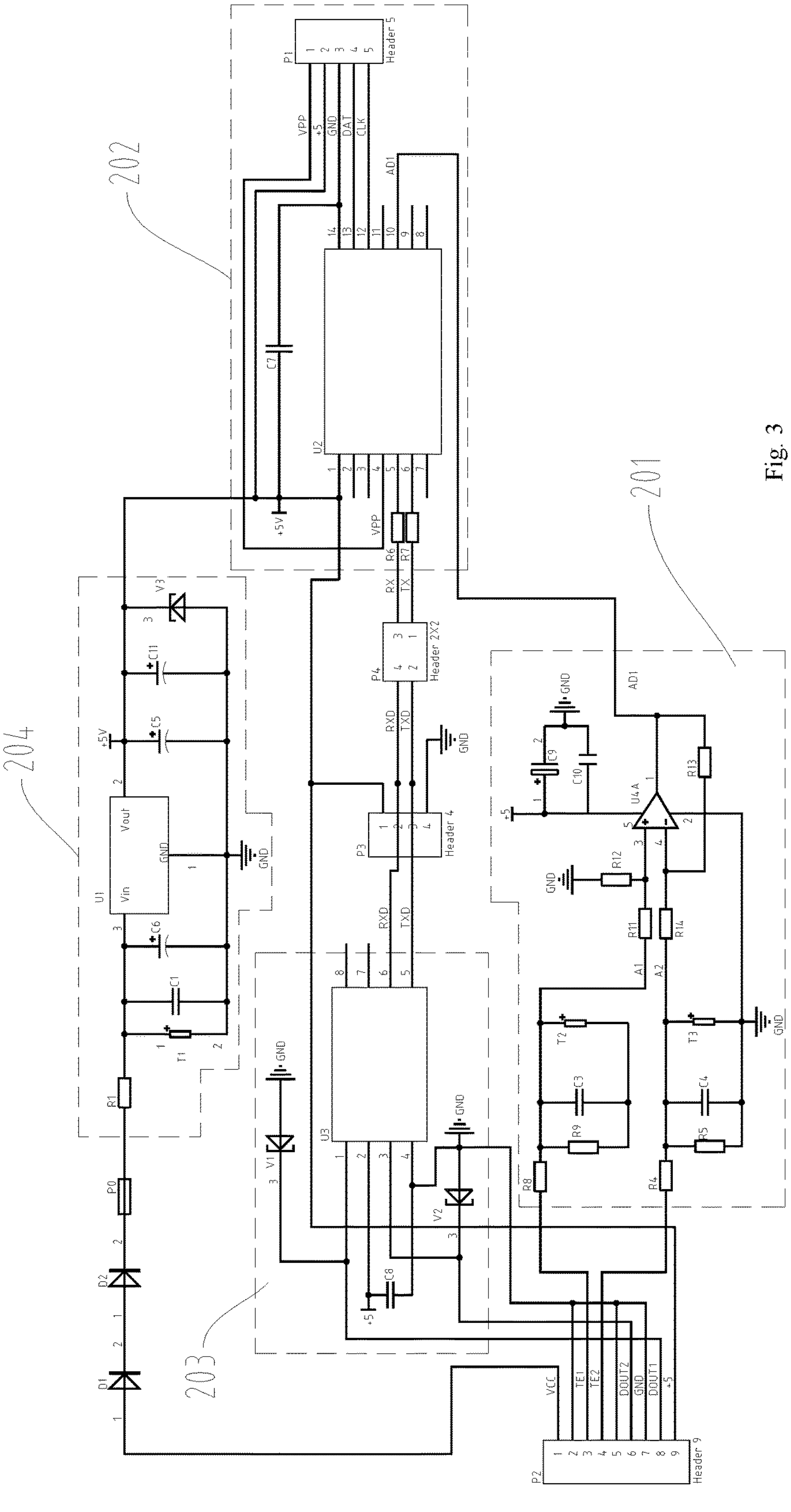
FIG. 3 is a schematic diagram showing a circuit of a display control panel according to an embodiment of the present disclosure.

As shown in FIG. 2, the display control device for the winch includes a display component 10 and a display control panel 20. The display component 10 is connected with the display control panel 20. The display control panel 20 is configured to control display of the display component 10. As shown in FIG. 3, a load detector 201, a processor 202 and a light controller 203 are provided on the display control panel 20. The load detector 201 is configured to detect a load situation of the motor M. The processor 202 is connected with the load detector 201 and the light controller 203 respectively, and is configured to output a corresponding light control signal to the light controller 203 according to the load situation of the motor M. The light controller 203 is connected with the display component 10, and is configured to control the display component 10 to display corresponding light according to the received light control signal.

That is, in embodiments of the present disclosure, the real-time load situation of the winch is detected by the load detector 201, such that the real-time load situation of the winch can be obtained in time during actual use, and different light display can be realized, thereby avoiding some extreme cases such as super-load operation.

The winch 100 is driven by the motor M, and the motor M can be a permanent magnet motor or a series motor. Each of these two kinds of motors has a current curve proportional to the load torque. That is, as long as the load torque is certain, the working current required by the motor with a same model is determined. The present disclosure adopts this principle, and detects the real-time load situation of the winch (i.e., the real-time load of the motor), such that different light display is realized based on different loads, thereby realizing informing the winch user of the real-time load situation of the winch during use, and avoiding some extreme cases.

Figure 4A:
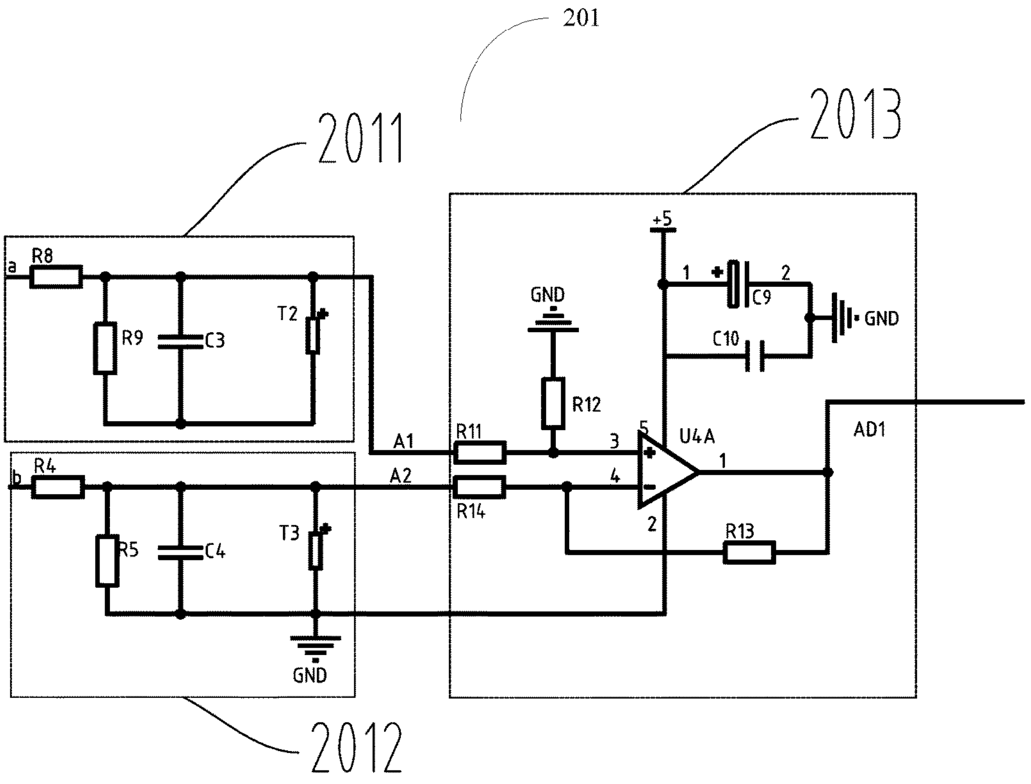
FIG. 4A is a schematic diagram showing a current signal collection circuit according to an embodiment of the present disclosure.

In an embodiment, as shown in FIG. 3 and FIG. 4A, the load detector 201 includes a current signal collection circuit, and the current signal collection circuit is configured to collect a working current of the motor M for detecting the load situation of the motor.

Figure 1:
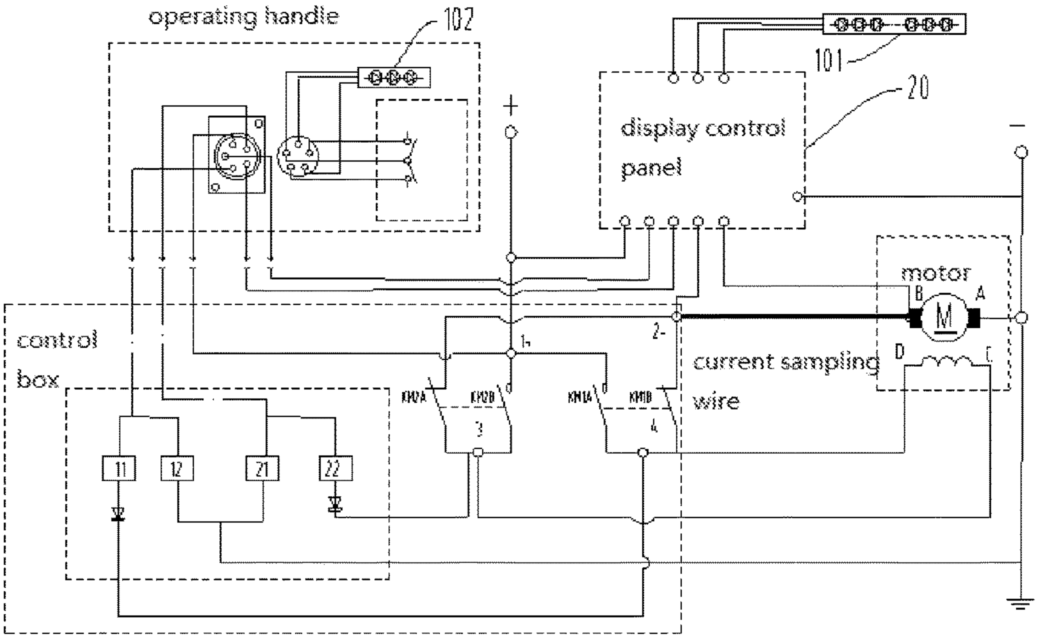
FIG. 1 is a schematic diagram showing a circuit principle of a winch for a vehicle according to an embodiment of the present disclosure.

As shown in FIG. 1, the current signal collection circuit can be connected with the motor M via a current sampling wire 2-B. As shown in FIG. 4A, the current signal collection circuit 201 includes a first sampling end a, a second sampling end b, a first filter and voltage divider 2011, a second filter and voltage divider 2012 and a differential operational amplifier 2013. The first sampling end a is connected with a first end of the current sampling wire. The second sampling end b is connected with a second end of the current sampling wire. The first filter and voltage divider 2011 is connected with the first sampling end a. The second filter and voltage divider 2012 is connected with the second sampling end b. A first input end of the differential operational amplifier 2013 is connected with the first filter and voltage divider 2011, a second input end of the differential operational amplifier 2013 is connected with the second filter and voltage divider 2012, and an output end of the differential operational amplifier 2013 is connected with the processor 202.

In other words, a voltage across two ends of the current sampling wire is sampled by the current signal collection circuit 201, and then is input into the differential operational amplifier 2013 after a resistive subdivision, and finally the amplified voltage signal is input to the single chip microcomputer in the processor 202.

The current sampling wire may have a sectional area of 25 mm2 and a length of 0.425 m, and a resistance of the current sampling wire in normal temperature is 0.31 mΩ. If the winch has a current of 100 A under a load of 1000 Lbs, then the voltage drop is about 31 mV. If the winch has a current of 300 A under a load of 5000 Lbs, then the voltage drop is about 93 mV. By that analogy, the real-time load situation of the winch can be obtained by detecting the voltage value on the current sampling wire.

Figure 4B:
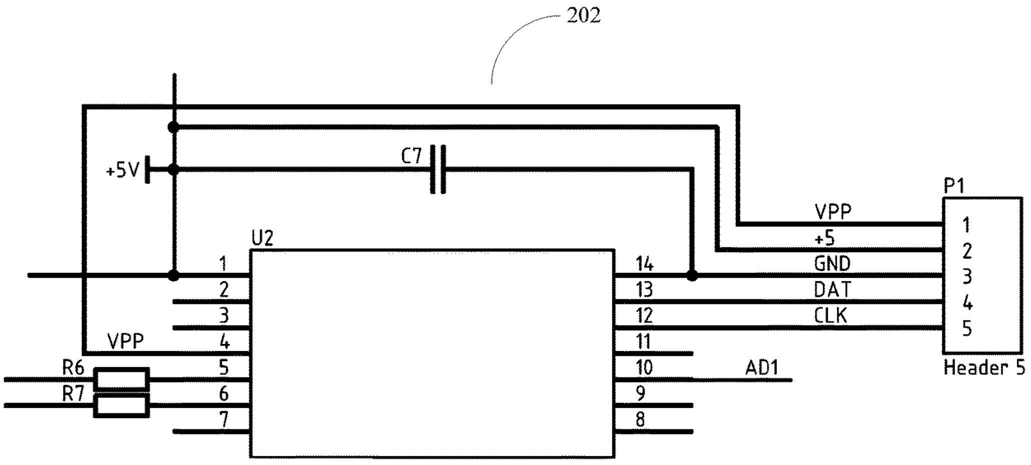
FIG. 4B is a schematic diagram showing a circuit of a processor according to an embodiment of the present disclosure.

In an embodiment, as shown in FIG. 3 and FIG. 4B, the processor 202 can adopt a pre-designed model of single chip microcomputer U2, collect the voltage signal output by the differential operational amplifier 203 via the AD sampling signal, calculate the value of current flowing through the current sampling wire currently, and then send an instruction to the light controller 203.

Figure 4C:
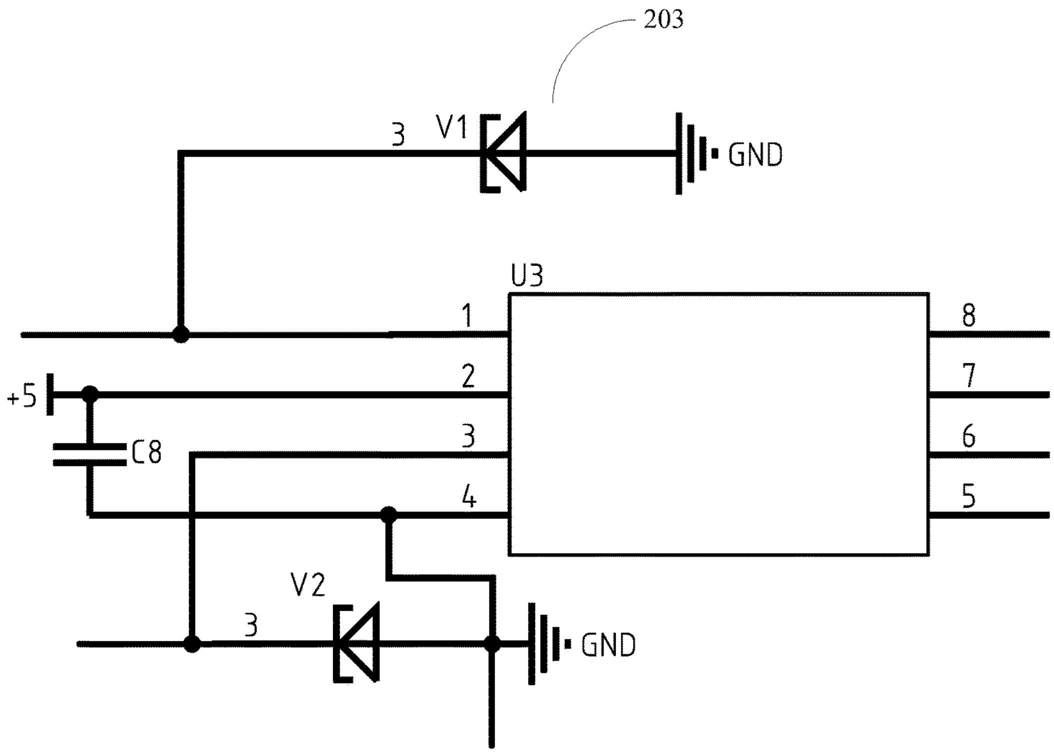
FIG. 4C is a schematic diagram showing a circuit of a light controller according to an embodiment of the present disclosure.

As shown in FIG. 3 and FIG. 4C, the light controller 203 is used as a control component for controlling three primary colors of the LED light bar. After receiving the instruction sent by the processor 202, the light controller 203 controls the three primary colors of the LED lamps in the display light bar to form different colors, such that the load situation of the winch is indicated by different numbers of lighted lamps and different colors.

Figure 4D:
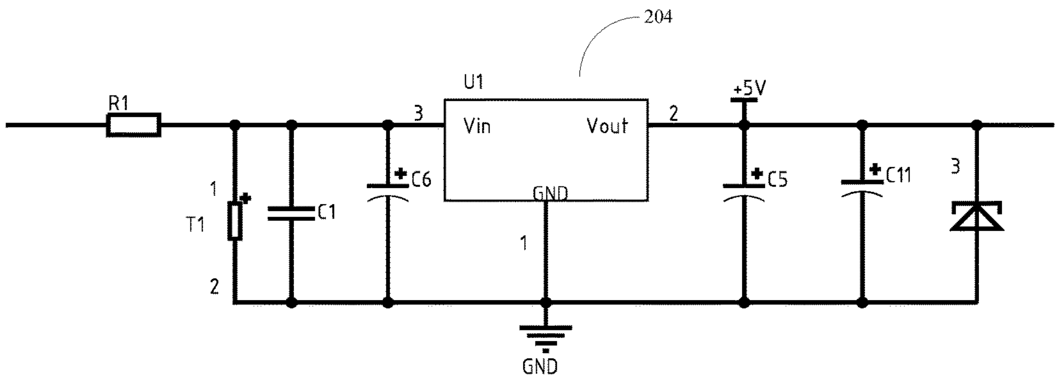
FIG. 4D is a schematic diagram showing a circuit of a power supply component according to an embodiment of the present disclosure.
Figure 5:
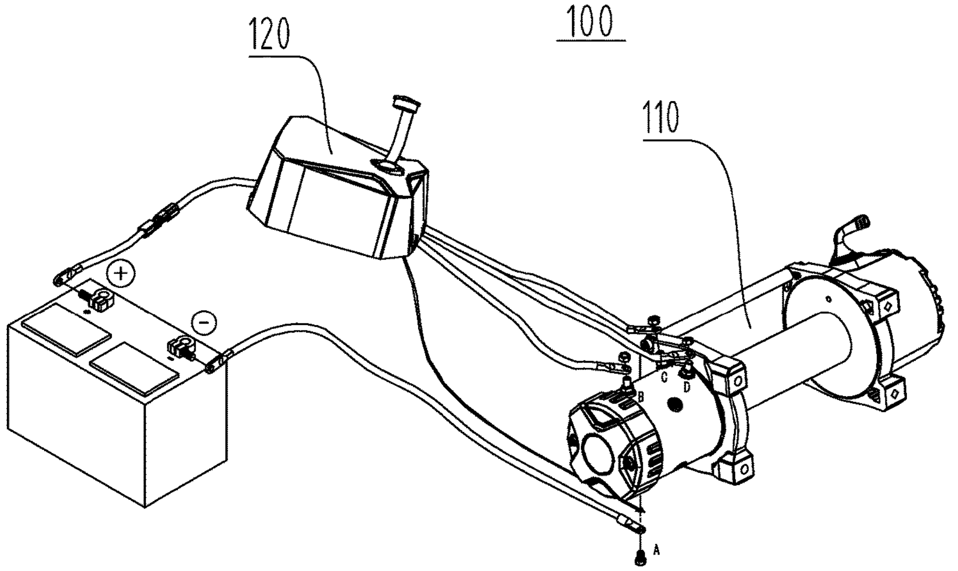
FIG. 5 is schematic diagram showing a wiring of a winch for a vehicle according to an embodiment of the present disclosure.

In an embodiment, as shown in FIG. 3 and FIG. 4D, a power supply component 204 is also provided on the display control panel 20. The power supply component 204 includes a voltage conversion circuit 2041, and the voltage conversion circuit 2041 is configured to convert a battery voltage of the vehicle for supplying power to the display control panel 20.

When the display component 10 includes both the first light bar 101 and the second light bar 102, the first light bar 101 and the second light bar 102 can be controlled to display a light simultaneously under the control of the light controller 202.

Each of the first light bar 101 and the second light bar 102 can include a plurality of LED lamps. For example, the number of LED lamps in the first light bar 101 can be same with the number of LED lamps in the second light bar 102, and the display way of the LED lamps in the first light bar 101 can be same with that of the LED lamps in the second light bar 102. Thus, the light controller 203 can control the first light bar 101 and the second light bar 102 to display the same light at the same time according to the received light control signal.

The light controller 203 can control the number of lighted lamps and the display color according to the received light control signal. For example, the light controller 203 can control the three primary colors of the LED lamps in the first light bar 101 and the second light bar 102 to form different colors, and the real-time load situation of the winch is indicated by different numbers of lighted lamps and different colors.

In an embodiment, different loads of the winch are corresponding to different numbers of lighted lamps and different colors of lighted lamps in the first light bar and/or the second light bar, for example, as shown in Table 1.

TABLE 1

| | Different loads of different models of winches (Lbs) | | | | | Different lamps | | | | | | | | | |
|---|---|---|---|---|---|---|---|---|---|---|---|---|---|---|---|
| | Design | Model | Model | Model | Model | | | | | | | | | | |
| No. | ratio | 1 | 2 | 3 | 4 | 1 | 2 | 3 | 4 | 5 | 6 | 7 | 8 | 9 | 10 |
| 1 | | Power on | Power on | Power on | Power on | blue | blue | blue | blue | blue | blue | blue | blue | blue | blue |
| 2 | | No load | No load | No load | No load | green | green | green | green | green | green | green | green | green | green |
| 3 | 10% | 1000 | 1200 | 1550 | 1750 | green | | | | | | | | | |
| 4 | 20% | 2000 | 2400 | 3100 | 3500 | green | green | | | | | | | | |
| 5 | 30% | 3000 | 3600 | 4650 | 5250 | green | green | green | | | | | | | |
| 6 | 40% | 4000 | 4800 | 6200 | 7000 | yellow | yellow | yellow | yellow | | | | | | |
| 7 | 50% | 5000 | 6000 | 7750 | 8750 | yellow | yellow | yellow | yellow | yellow | | | | | |
| 8 | 60% | 6000 | 7200 | 9300 | 10500 | yellow | yellow | yellow | yellow | yellow | yellow | | | | |
| 9 | 70% | 7000 | 8400 | 10850 | 12250 | red | red | red | red | red | red | red | | | |
| 10 | 80% | 8000 | 9600 | 12400 | 14000 | First eight lamps are red and flashing slowly (flashing interval is about 0.3 S) | | | | | | | | | |
| 11 | 90% | 9000 | 10800 | 13950 | 15750 | First nine lamps are red and flashing with a medium speed (flashing interval is about 0.2 S) | | | | | | | | | |
| 12 | 100% | 10000 | 12000 | 15500 | 17500 | All lamps are red and flashing fast (flashing interval is about 0.05 S) | | | | | | | | | |

The battery voltage of the vehicle can be 12.8V, and the voltage conversion circuit 2041 converts the voltage of 12.8V to the voltage of 5V for providing power to the display control panel 20.

In an embodiment, as shown in FIGS. 1, 5, 6, 7 and 8, the display component 10 may include a first light bar 101, or may include a second light bar 102, or may include both the first light bar 101 and the second light bar 102. The first light bar 101 may be disposed on a winch body 110 of the winch 100, and the first light bar 101 is configured to display different lights under a control of the light controller 203. The second light bar 102 may be disposed on an operating handle 120 of the winch 100, and the second light bar 102 is also configured to display different lights under the control of the light controller 203.

In Table 1, each of the first light bar and the second light bar has 10 LED lamps.

Figure 6:
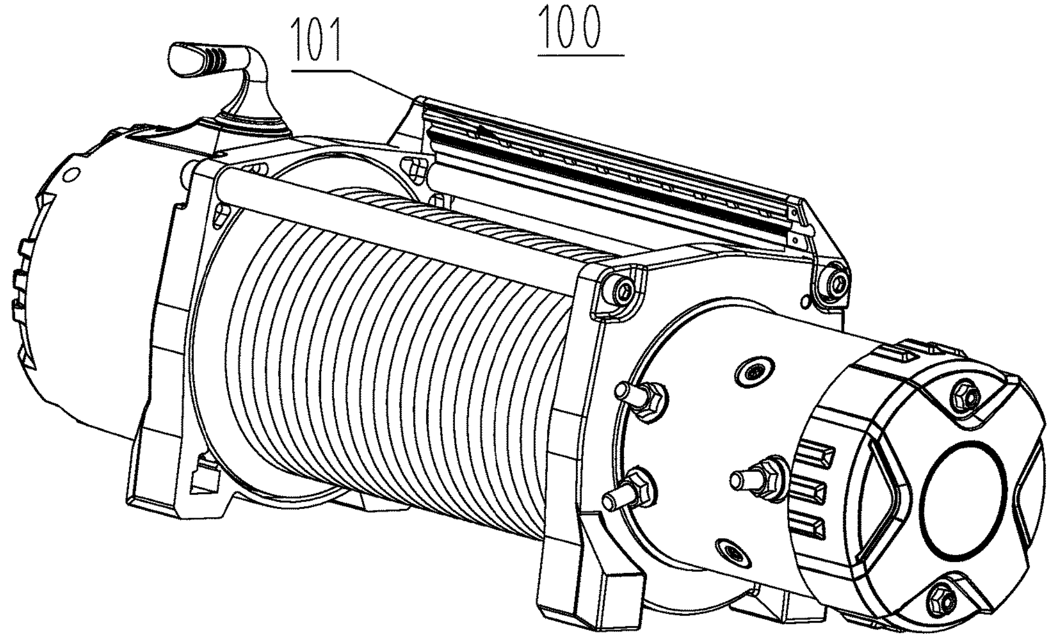
FIG. 6 is a schematic diagram showing a first light bar disposed on a winch body according to an embodiment of the present disclosure.

In an embodiment, as shown in FIG. 6, the first light bar 101 is built in the winch body 110.

Figure 7:
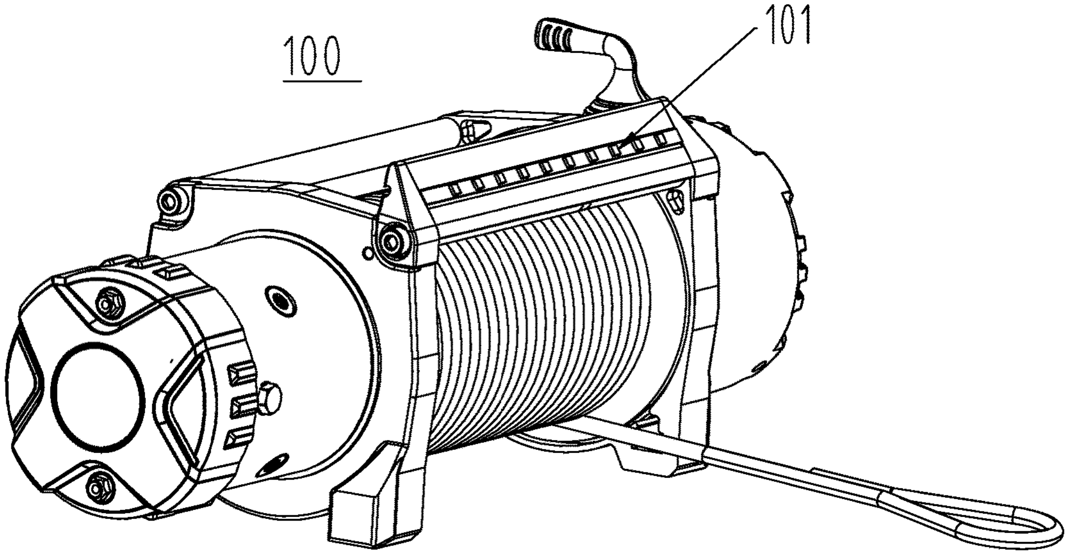
FIG. 7 is a schematic diagram showing a first light bar disposed on a winch body according to another embodiment of the present disclosure.

In another embodiment, as shown in FIG. 7, the first light bar 101 is exposed on the winch body 110.

Figure 8:
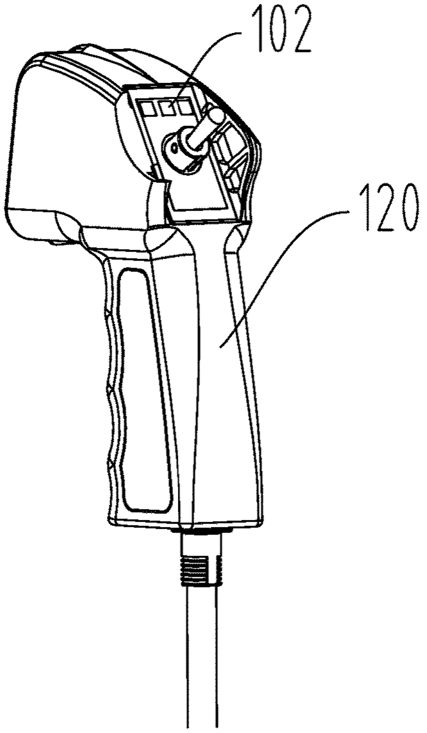
FIG. 8 is a schematic diagram showing a second light bar disposed on an operating handle according to an embodiment of the present disclosure.

In some embodiments, the display component 10 may only include the second light bar 102, and the second light bar 102 is disposed on the operating handle 120 of the winch, as shown in FIG. 8. The second light bar 102 may also display different lights under the control of the light controller 203. Similarly, the second light bar 102 may also include a plurality of LED lamps. The light controller 203 can control the number and colors of the lighted lamps according to the received light control signal, for example, control the three primary colors of the LED lamps in the second light bar 102 to form different colors, such that the load situation of the winch is indicated by different numbers and different colors of lighted lamps.

In some embodiments, the display component 10 may only include the first light bar 101, in which the first light bar 101 can be built in the winch body 110, as shown in FIG. 6, or can be exposed on the winch body 110, as shown in FIG. 7.

The first light bar 110 may also display different lights under the control of the light controller 203. Similarly, the first light bar 110 may also include a plurality of LED lamps, and the light controller 203 controls the number and the color of lighted lamps of the plurality of LED lamps according to the received light control signal, for example, controls the three primary colors of the LED lamps in the first light bar 101 to form different colors, such that the load situation of the winch is indicated by different numbers and different colors of the lighted lamps.

In conclusion, with the display control device according to embodiments of the present disclosure, the load situation of the motor is detected by the load detector, the corresponding light control signal is output to the light controller by the processor according to the real-time load situation of the motor, and the display component is controlled by the light controller to display different lights. Thus, the display control device according to embodiments of the present disclosure can realize different light display based on different load situations of the winch, and can obtain the real-time load situation of the winch in time during actual use, thus avoiding some extreme cases such as super-load operation, ensuring safe, reliable and stable operation of the winch, prolong service life of the winch, and sufficiently satisfying usage requirements.

Moreover, embodiments of the present disclosure provide a winch for a vehicle. The winch includes the display control device described above.

According to the winch provided by embodiments of the present disclosure, with the above display control device, different light display can be realized based on different load situations, and the real-time load situation of the winch can be obtained in time during actual use, thus avoiding some extreme cases such as super-load operation, ensuring safe, reliable and stable operation of the winch, prolong service life of the winch, and sufficiently satisfying usage requirements.

Furthermore, embodiments of the present disclosure provide a vehicle. The vehicle includes the winch for the vehicle described above.

According to the vehicle provided by embodiments of the present disclosure, different light display can be realized based on different load situations, and the real-time load situation of the winch can be obtained in time during actual use, thus avoiding some extreme cases such as super-load operation, ensuring safe, reliable and stable operation of the winch, prolong service life of the winch, and sufficiently satisfying usage requirements.

It is to be understood that phraseology and terminology used herein with reference to device or element orientation (such as, terms like "longitudinal", "lateral", "up", "down", "front", "rear", "left", "right", "vertical", "horizontal", "top", "bottom", "inside", "outside") are only used to simplify description of the present invention, and do not indicate or imply that the device or element referred to must have or operated in a particular orientation. They cannot be seen as limits to the present disclosure.

Moreover, terms of "first" and "second" are only used for description and cannot be seen as indicating or implying relative importance. Thus, the feature defined with "first" and "second" can indicate or imply including one or more of the feature. In the description of the present disclosure, "a plurality of" refers to two or more, unless expressly otherwise limited.

Unless otherwise stipulated and restricted, it is to be explained that terms of "installation", "linkage" and "connection" shall be understood broadly, for example, it could be permanent connection, removable connection or integral connection; it could be direct linkage, indirect linkage or inside linkage within two elements; it could be electric connection or mechanical connection. Those of ordinary skill in the art shall understand the concrete notations of the terms mentioned above according to specific circumstances.

In embodiments of the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the description of embodiments of the present disclosure, reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. In this specification, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A display control device for a winch of a vehicle, the winch comprising a motor for driving an operation of the winch, and the display control device comprising:

a display component;

a display control panel, comprising:

a load detector, configured to detect a load situation of the motor;

a processor, connected with the load detector, and configured to output a light control signal according to the load situation of the motor; and a light controller, connected with the processor and the display component respectively, and configured to receive the light control signal and to control the display component according to the light control signal, wherein the load detector comprises a current signal collection circuit connected with the motor via a current sampling wire and configured to collect a working current of the motor for detecting the load situation of the motor;

said current signal collection circuit includes:

a first sampling end, connected with a first end of the current sampling wire;

a second sampling end, connected with a second end of the current sampling wire;

a first filter and voltage divider, connected with the first sampling end;

a second filter and voltage divider, connected with the second sampling end; and a differential operational amplifier, having a first input end connected with the first filter and voltage divider, a second input end connected with the second filter and voltage divider, and an output end connected with the processor.

2. The display control device according to claim 1, wherein the display component comprises a first light bar disposed on a winch body of the winch and configured to display different lights under a control of the light controller.

3. The display control device according to claim 1, wherein the display component comprises a first light bar and a second light bar, the first light bar is disposed on a winch body of the winch and configured to display different lights under a control of the light controller, and the second light bar is disposed on an operating handle of the winch and configured to display different lights under a control of the light controller.

4. The display control device according to claim 3, wherein the first light bar and the second light bar are configured to display a light simultaneously under the control of the light controller.

5. The display control device according to claim 4, wherein, each of the first light bar and the second light bar comprises a plurality of LED lamps, and the light controller is configured to control a number and a color of lighted lamps of the plurality of LED lamps according to the light control signal.

6. The display control device according to claim 2, wherein the first light bar is built in the winch body of the winch.

7. The display control device according to claim 3, wherein the first light bar is exposed on the winch body of the winch.

8. The display control device according to claim 1, wherein the display control panel further comprises a power supply component having a voltage conversion circuit, in which the voltage conversion circuit is configured to convert a battery voltage of the vehicle for supplying power to the display control panel.

9. A winch for a vehicle, comprising a display control device for the winch, wherein the winch comprises a motor for driving an operation of the winch, and the display control device comprises:

a display component;

a display control panel, comprising:

a load detector, configured to detect a load situation of the motor;

a processor, connected with the load detector, and configured to output a light control signal according to the load situation of the motor; and a light controller, connected with the processor and the display component respectively, and configured to receive the light control signal and to control the display component according to the light control signal, wherein the load detector comprises a current signal collection circuit connected with the motor via a current sampling wire and configured to collect a working current of the motor for detecting the load situation of the motor;

said signal collection circuit includes:

a first sampling end, connected with a first end of the current sampling wire;

a second sampling end, connected with a second end of the current sampling wire;

a first filter and voltage divider, connected with the first sampling end;

a second filter and voltage divider, connected with the second sampling end; and a differential operational amplifier, having a first input end connected with the first filter and voltage divider, a second input end connected with the second filter and voltage divider, and an output end connected with the processor.

10. The winch according to claim 9, wherein the display component comprises a first light bar disposed on a winch body of the winch and configured to display different lights under a control of the light controller.

11. The winch according to claim 9, wherein the display component comprises a first light bar and a second light bar, the first light bar is disposed on a winch body of the winch and configured to display different lights under a control of the light controller, and the second light bar is disposed on an operating handle of the winch and configured to display different lights under a control of the light controller.

12. The winch according to claim 11, wherein the first light bar and the second light bar are configured to display a light simultaneously under the control of the light controller.

13. The winch according to claim 12, wherein, each of the first light bar and the second light bar comprises a plurality of LED lamps, and the light controller is configured to control a number and a color of lighted lamps of the plurality of LED lamps according to the light control signal.

14. The winch according to claim 10, wherein the first light bar is built in the winch body of the winch.

15. The winch according to claim 11, wherein the first light bar is exposed on the winch body of the winch.

16. The winch according to claim 9, wherein the display control panel further comprises a power supply component having a voltage conversion circuit, in which the voltage conversion circuit is configured to convert a battery voltage of the vehicle for supplying power to the display control panel.

17. A vehicle, comprising the winch according to claim 9.

* * * * *